Aug. 20, 1940.   H. PERKINS   2,212,453
MOTOR VEHICLE
Filed Oct. 18, 1939   3 Sheets-Sheet 1

Inventor
HERBERT PERKINS
by
Norris & Bateman
Attorney

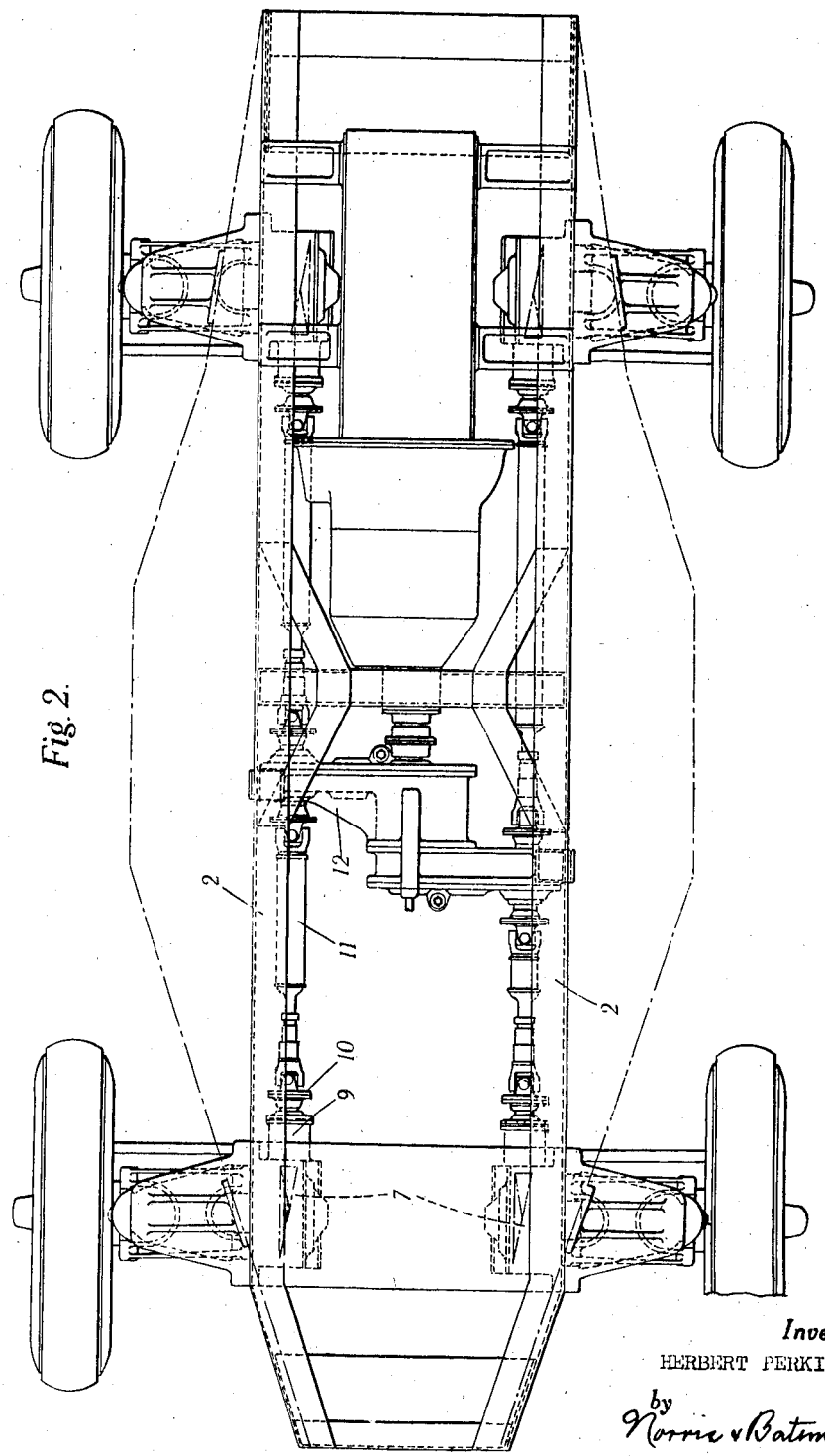

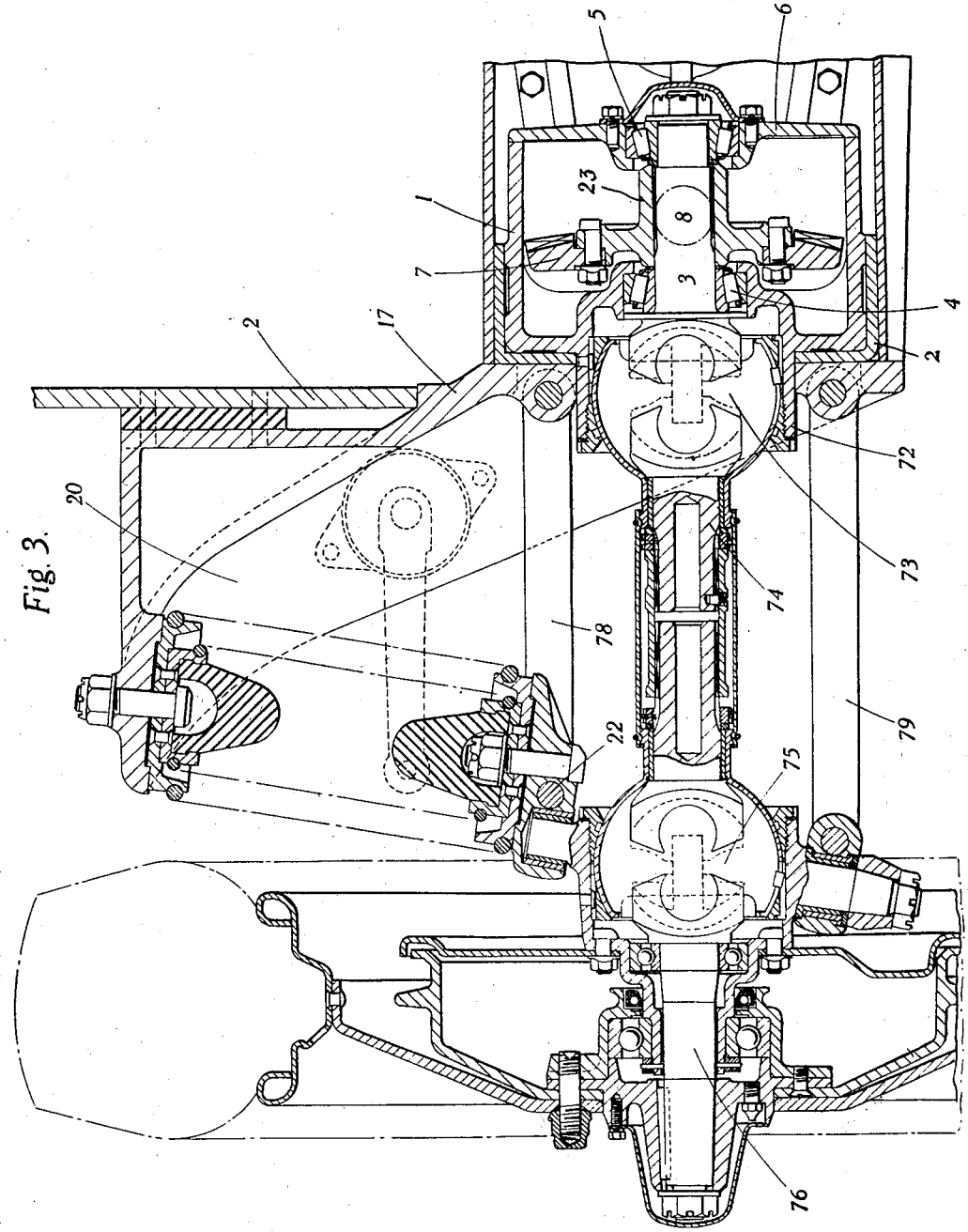

UNITED STATES PATENT OFFICE 2,212,453

MOTOR VEHICLE

Herbert Perkins, Solihull, England, assignor to The Birmingham Small Arms Company Limited, Birmingham, England, a British company Application October 18, 1939, Serial No. 300,077
In Great Britain October 17, 1938

8 Claims. (Cl. 180—45)

This invention relates to motor vehicles, and refers more particularly to the kind wherein both the front and the rear wheels of the vehicle are independently sprung and adapted to be driven and steered.

The object of the invention is to provide new or improved means for mounting on the longitudinal side members of the chassis frame of the vehicle the front and rear wheels and the transmission mechanism which is arranged to drive said wheels, and according to the invention each of the road wheels is adapted to be driven from a shaft mounted in a housing secured to the chassis frame of the vehicle, such shaft being connected by a suitable gearing to one of the propeller shafts of the vehicle.

A separate propeller shaft is preferably provided for each road wheel, all the propeller shafts being controlled by means of a centrally disposed differential gearing mechanism.

According to the preferred arrangement I provide for each front and rear wheel an arrangement comprising a box-shaped housing in which is mounted on suitable bearings a short axle carrying a bevel or other gear wheel engaging with a pinion on a longitudinal shaft mounted in said housing and coupled to a propeller shaft, said housing being adapted to be located on the inside of the longitudinal side member of the chassis frame, and has formed on its outer side a sleeve part arranged to pass through a hole formed in said side member, said sleeve having assembled therein the parts of a universal joint which constitutes a coupling between the aforesaid axle and a driving shaft which is coupled at its other end by a universal joint to the stub axle of the road wheel, an outer member comprising a plate in which is formed a hole to permit of its assembly on the outer end of the stem part of the aforesaid housing, said plate having formed thereon joint lugs for the upper and lower members of the link connection to a swivel carrier in which is mounted the hub swivel, and has also formed or fitted thereto an arm or bracket adapted to constitute a support for a spring or springs located between the end of said bracket and the upper link connection to the swivel carrier, the aforesaid housing and plate being adapted to be rigidly fixed to the longitudinal side member by means of bolts or the like.

The mechanism for effecting the steering of the front or rear wheels may be of any convenient or well known kind.

The invention will be more completely understood from the following detailed description which is given in conjunction with the accompanying drawings in which:

Figure 2 is a plan view of the arrangement shown in Figure 1, while

Figure 3 is an enlarged vertical section of the mechanism provided for securing one of the road wheels in position.

Figure 1:
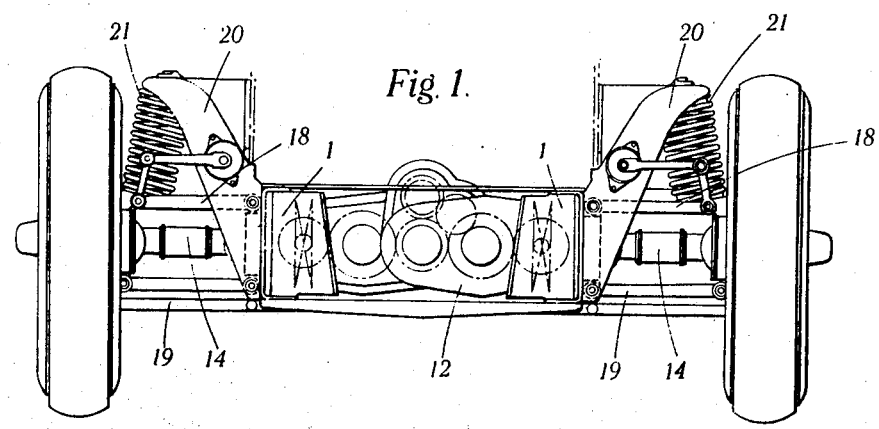
Figure 1 is an end view of the chassis frame of a motor vehicle with the road wheels mounted in accordance with the invention.

Referring now to these drawings, I provide a box-shaped housing 1 adapted to be mounted on the inside of the longitudinal side member 2 of the chassis frame and to have mounted therein a short axle 3 carried at or near one end on a suitable anti-friction bearing 4 mounted in said box, and at its other end on a bearing 5 mounted in an outer cover plate 6 fixed to said housing 1, and on said shaft 3 is mounted a bevel wheel 7 arranged to engage with a bevel pinion 8 carried on a longitudinally disposed spindle 9 mounted in a bearing fitted in the one end of said housing, said spindle being provided with a flexible or other suitable coupling for connection to a longitudinally disposed propeller shaft 11 connected to one of the output shafts of a centrally disposed differential gearing 12 which is common to the propeller shafts for the front and the rear wheels.

On the aforesaid housing 1 is formed a tubular extension or sleeve part 72 which is arranged to pass through a hole formed in the longitudinal side member 2 of the frame, said sleeve part being adapted to house a universal joint 73 formed on or attached to the opposing ends of the aforesaid axle mounted in the housing and a telescopic driving shaft 74 connected by another universal joint 75 to the stub axle 76 of the road wheel.

On the outside of the longitudinal side member of the frame is mounted a plate 17 having formed therein a central hole to permit of its assembly over the protruding outer end of the tubular sleeve part 72 of the aforesaid bevel gear housing 1, and on said plate 17 are formed upper and lower joint lugs for attachment of the upper and lower link members, 78, 79 which in known manner are employed in the independent spring mounting of the wheels, and on the upper side of said plate 17 is formed an upwardly and outwardly extending arm or bracket 20 arranged to constitute a support or abutment for the upper ends of a spring or springs 21, the lower ends of which are supported in any convenient known manner at or near the hinge connection 22 of the upper link 18 to the swivel carrier.

The aforesaid housing 1 and outer plate when assembled respectively on the inner and outer sides of the longitudinal side members of the chassis frame are rigidly fixed thereto by bolts or like means arranged to pass through holes formed in both of said members and the side member of the frame.

It will be readily understood that in order to turn the front and rear road wheels in the same direction by means of longitudinally disposed propeller shafts driven from a centrally disposed differential gearing, it is necessary for the bevel wheels 7 in the housings 1 of the front and rear axles to be disposed in opposite relation in their engagement with the bevel pinions 8 mounted in said housings and connected to the front and rear propeller shafts. In order that each complete unit may be adapted for use for either front or rear wheels, the bevel wheels mounted on the aforesaid axles are formed on a sleeve part 23 so constructed and arranged that by turning or reversing the position of the said bevel wheel in the mounting of same on its axle, it can be arranged to engage with either side of the bevel pinion mounted in the housing and coupled to a propeller shaft, and be thus adapted to drive either a front or a rear wheel.

Having thus described my invention, what I claim as new and desire to secure by Letters Patent is:

1. In a motor vehicle, the combination of a main frame having a longitudinal side member, a driving shaft extending longitudinally along the inner side of said side member, a gear housing fixed to the inner side of said side member and having a sleeve extending through said side member to its outer side, a shaft in said housing having a universal joint disposed in the sleeve of said housing, a road wheel mounted at the outer side of said side member, a propeller shaft connected at one end to said road wheel and connected at its other end to said universal joint in the sleeve of said housing, and driving gearing within said housing connecting said shaft in said housing and said driving shaft.

2. In a motor vehicle, the combination of a main frame having a longitudinal side member, a driving shaft extending longitudinally along the inner side of said side member, a gear housing fixed to the inner side of said side member and having a sleeve extending through said side member to its outer side, a road wheel mounted at the outer side of said side member for movement vertically relatively thereto, a propeller shaft having a universal joint therein connecting it to said wheel for driving it and having another universal joint therein mounted within the sleeve of said housing, and driving gearing in said housing connecting the universal joint in said sleeve to said longitudinal driving shaft.

3. In a motor vehicle, the combination of a main frame having a longitudinal side member, a driving shaft extending longitudinally along the inner side of said side member, a gear housing fixed to the inner side of said side member and having a sleeve extending through said side member to its outer side, a road wheel mounted at the outer side of said side member for movement vertically relatively thereto, a propeller shaft having a universal joint therein connecting it to said wheel for driving it and having another universal joint therein mounted within the sleeve of said housing, a telescopic joint in said propeller shaft, and driving gearing in said housing connecting the universal joint in said sleeve to said longitudinal driving shaft.

4. In a motor vehicle, the combination of a main frame having a longitudinal side member, a driving shaft extending longitudinally along the inner side of said side member, a gear housing fixed to the inner side of said side member and having a sleeve extending through said side member to its outer side, a road wheel at the outer side of said side member, a pair of upper and lower links pivotally connected to said side member and the wheel to guide the latter for vertical movement relatively to the side member of the frame, a universal joint mounted in the sleeve of said housing, a second universal joint mounted on the outer ends of said links and connected to the wheel for driving it, a propeller shaft disposed between said upper and lower links and connecting said universal joints, and gearing in said housing connecting the universal joint in said sleeve to said longitudinal driving shaft.

5. In a motor vehicle, the combination of a main frame having a longitudinal side member, a driving shaft extending longitudinally along the inner side of the said side member, a gear housing fixed to the inner side of said side member and having a sleeve extending through said side member to its outer side, a road wheel at the outer side of said side member, a pair of upper and lower links pivotally connected to said side members and the wheel to guide the latter for vertical movement relatively to the side member of the frame, a bracket fixed to the outer side of said side member and projecting outwardly above said links, a supporting spring interposed between said bracket and the outer ends of said links, a universal joint mounted in the sleeve of said housing, a second universal joint mounted on the outer ends of said links and connected to the wheel for driving it, a propeller shaft disposed between said upper and lower links and connecting said universal joints, and gearing in said housing connecting the universal joint in said sleeve to said longitudinal driving shaft.

6. In a motor vehicle, the combination of a main frame having a longitudinal side member, a driving shaft extending longitudinally along the inner side of said side member, a gear housing fixed to the inner side of said side member and having a sleeve extending through said side member to its outer side, a road wheel at the outer side of said side member, a pair of upper and lower links pivotally connected to said side member, a wheel mounting connecting the outer ends of said links and supporting the wheel for vertical movement relatively to said side member of the frame, a universal joint mounted in the sleeve of said housing, a second universal joint mounted in said wheel mounting and connected to the wheel for driving it, a propeller shaft connecting said universal joints, and driving gearing in said housing connecting the universal joint in said sleeve to said longitudinal driving shaft.

7. In a motor vehicle, the combination of a main frame having a longitudinal side member, a driving shaft extending longitudinally along the inner side of said side member, a gear housing fixed to the inner side of said side member and having a sleeve extending through said side member to its outer side, a road wheel at the outer side of said side member, a cover plate fixed to the outer side of said side member of the frame and having a spring supporting bracket extending outwardly therefrom, a pair of upper and lower links pivotally connected to said cover plate and extending outwardly beyond the said bracket, a supporting spring interposed between said bracket and the outer ends of said links, a wheel mounting connecting the outer ends of said links and supporting the wheel for vertical movements relatively to the side member of the frame, a universal joint mounted in the sleeve of said housing, a second universal joint mounted within said wheel mounting, a propeller shaft disposed between said upper and lower links and connecting said universal joints and driving gearing connecting the universal joint in the sleeve of said housing and said longitudinal driving shaft.

8. In a motor vehicle of the kind having front and rear wheels for driving and steering and a chassis frame having longitudinal side members, the combination of a gear housing for each wheel secured to the inner side of the respective longitudinal side member of the chassis frame and having a sleeve formed on its outer side and passing outwardly through the respective side member of the frame, a longitudinal driving shaft mounted at the inner side of the respective side member of the frame and connecting the respective housings, a universal joint mounted in the sleeve of each housing, gearing in each housing connecting the universal joint in its sleeve to the end of the respective longitudinal driving shaft, a second universal joint connected to the axle of each wheel, a propeller shaft connecting the universal joint in each sleeve to the universal joint connected to the respective wheel, plates fixed to the outer sides of the respective side members of the frame and provided with apertures through which the sleeves of the respective housings extend outwardly, each plate having lugs thereon, upper and lower links pivoted to the lugs of the respective plates for vertical swinging movement, a swivel carrier for each wheel connecting the outer ends of the respective upper and lower links and housing the universal joint connected to the respective wheel axle, an arm fixed to each plate and projecting outwardly therefrom, and a spring located between the end of each arm and the respective swivel carrier.

HERBERT PERKINS.